US012656062B2

(12) United States Patent
Toro

(10) Patent No.: US 12,656,062 B2
(45) Date of Patent: Jun. 16, 2026

(54) BURNER, APPARATUS AND METHOD FOR THE FIRING OF CERAMIC ARTICLES

(71) Applicant: SACMI FORNI & FILTER S.P.A., Imola (IT)

(72) Inventor: Alberto Toro, Imola (IT)

(73) Assignee: SACMI FORNI & FILTER S.P.A., Imola (IT)

(*) Notice: Subject to any disclaimer, the term of this patent is extended or adjusted under 35 U.S.C. 154(b) by 412 days.

(21) Appl. No.: 18/570,584

(22) PCT Filed: May 24, 2022

(86) PCT No.: PCT/IB2022/054829

§ 371 (c)(1),
(2) Date: Dec. 14, 2023

(87) PCT Pub. No.: WO2022/249047

PCT Pub. Date: Dec. 1, 2022

(65) Prior Publication Data

US 2024/0210113 A1 Jun. 27, 2024

(30) Foreign Application Priority Data

May 25, 2021 (IT) ........................ 102021000013535

(51) Int. Cl.
*F27B 9/36* (2006.01)
*F23C 6/04* (2006.01)
(Continued)

(52) U.S. Cl.
CPC .................. *F27B 9/36* (2013.01); *F23C 6/04* (2013.01); *F23D 14/10* (2013.01); *F23D 14/64* (2013.01);
(Continued)

(58) Field of Classification Search
CPC .......... F23D 14/10; F23D 14/62; F23D 14/64; F23D 2207/00; F23D 14/02; F23D 14/06;
(Continued)

(56) References Cited

U.S. PATENT DOCUMENTS 4,154,576 A * 5/1979 Bossetti .................. F27B 9/025
432/128
4,157,241 A * 6/1979 Samuelson ............. F23N 1/105
126/91 A (Continued)

FOREIGN PATENT DOCUMENTS

WO 2009/047338 A2 4/2009
WO WO-2009118633 A1 * 10/2009 ......... F27D 99/0033
WO 2020/183390 A1 9/2020

OTHER PUBLICATIONS

International Preliminary Report on Patentability received for PCT Patent Application No. PCT/IB2022/054829, mailed on Dec. 7, 2023, 07 pages.

(Continued)

*Primary Examiner* — Gregory A Wilson
(74) *Attorney, Agent, or Firm* — Workman Nydegger

(57) ABSTRACT

A burner for the firing of ceramic articles which can be installed in an industrial kiln can include a firing chamber; the burner further including a mixing body; a spark device; a flame detection device; a first tubular discharge element configured to be flown through by a fluid flowing out of the mixing body and provided with a first end and with a second end opposite the first end; wherein the mixing body comprises both a partitioning system of the fuel, configured to divide the fuel in a plurality of first portions, and an oxidizer partitioning system, configured to divide the oxidizer into a plurality of second portions, which are conveyed so as be mixed in at least two different stages with the first portions.

18 Claims, 9 Drawing Sheets

(51) Int. Cl.
*F23D 14/10* (2006.01)
*F23D 14/22* (2006.01)
*F23D 14/64* (2006.01)
*F23N 1/02* (2006.01)

(52) U.S. Cl.
CPC .... *F23N 1/022* (2013.01); *F23C 2900/99001* (2013.01); *F23C 2900/9901* (2013.01); *F23D 2209/10* (2013.01)

(58) Field of Classification Search
CPC .. F23D 14/08; F23D 14/22; F23D 2206/0015; F23C 6/04; F23C 2900/9901; F23C 2201/20
See application file for complete search history.

(56) References Cited

U.S. PATENT DOCUMENTS

| | | | | |
|---|---|---|---|---|
| 10,234,136 | B2 * | 3/2019 | Dell | F23C 7/004 |
| 12,222,162 | B2 * | 2/2025 | Toro | F23D 14/70 |
| 2015/0153040 | A1 | 6/2015 | Rivera Garza | |
| 2015/0276316 | A1 * | 10/2015 | Hartschuh Schaub | F27B 9/36<br>432/173 |
| 2018/0010588 | A1 * | 1/2018 | Ohta | F04B 9/1053 |

OTHER PUBLICATIONS

PCT International Search Report and Written Opinion for International Application PCT/IB2022/054829 mailed Aug. 9, 2022.

* cited by examiner

BURNER, APPARATUS AND METHOD FOR THE FIRING OF CERAMIC ARTICLES

CROSS-REFERENCE TO RELATED APPLICATIONS

The present invention is a 35 U.S.C. § 371 U.S. National Stage of PCT Application No. PCT/IB2022/054829, filed on May 24, 2022, which claims priority to Italian Patent Application No. 102021000013535 filed on May 25, 2021, the entire disclosure of each of the aforementioned patent applications is incorporated herein by reference.

TECHNICAL FIELD OF THE INVENTION

The present invention relates to a burner and an apparatus for the firing of ceramic articles. In particular, the present invention is advantageously, but not exclusively, suitable for use in the firing of ceramic articles to obtain tiles, to which the description below shall explicitly refer, but without loss of generality.

STATE OF THE ART

The firing of ceramic articles to obtain tiles generally takes place in tunnel kilns, delimited by two opposite walls and a roof. These kilns are usually heated by two series of burners, each arranged on one side of the tunnel.

Typically, the burners, operating with natural gas (for example methane), are positioned on the side walls of the tunnel on various levels and are facing towards the opposite wall.

The firing cycle of the ceramic articles is studied with great precision and comprises: heating of the ceramic articles starting from the inlet of the kiln, their stay inside the firing chamber at a predefined temperature and controlled cooling before reaching the outlet of the kiln.

Usually, the ceramic articles are conveyed on a conveyor of large size consisting of a series of ceramic rollers. Consequently, it is important to ensure that the temperature inside the firing chamber is uniform along the whole of the width of the kiln.

To this end, different types of industrial burners, and different arrangements of these burners inside complex apparatus, have been developed to obtain an increasingly constant temperature inside the firing chamber. In particular, above all in very wide tunnel kilns, an uneven distribution of the temperature generally occurs in the various longitudinal sections, and local temperature peaks are determined on the basis of the position of the burners.

To overcome the aforesaid problems, different types of "high velocity" burners have been produced, which introduce combustion flue gases (and flame) in depth inside the firing chamber, so as to improve the heat exchange inside it.

However, as previously mentioned, ceramic burners of known type are substantially supplied with fossil fuels (methane, LPG), which determine an anti-ecological use of non-renewable resources. For this reason, various "environmentally sustainable" solutions are under examination, such as the use of non-fossil fuels, one of which is hydrogen.

Currently, however, the use of hydrogen is hampered by various factors. Firstly, this fuel is the cause of high temperature peaks, which generate an increase in NOx production also relative to fossil fuels. Moreover, hydrogen usually generates a very unstable flame, which determines a much greater flash-back relative to methane (or LPG), consequently generating a greatly retracted flame front (in proximity of the fuel feeding duct), which causes overheating of the burner and risks being the cause of uncontrolled explosions with possible damages to said burners and to the firing apparatus.

All these elements, among others, determine a lack of homogeneity in the temperature inside the kiln, which inevitably causes firing defects in the ceramic articles. In particular, the defects can relate both to size and to shape, such as lack of planarity. Therefore, this results in an increase in rejects.

The object of the present invention is to produce an apparatus, a burner and a method, which allow the drawbacks of the prior art to be overcome, at least partially, and which are also easily and economically implemented.

SUBJECT AND SUMMARY OF THE INVENTION

In accordance with the present invention, a burner, an apparatus and a method are provided for the firing of ceramic articles as claimed in the independent claims below and, preferably, in any one of the claims directly or indirectly dependent on the independent claims.

The claims describe preferred embodiments of the present invention forming an integral part of the present description.

BRIEF DESCRIPTION OF THE DRAWINGS

The present invention will now be described with reference to the accompanying drawings, which illustrate some non-limiting examples of embodiment thereof, wherein.

DETAILED DESCRIPTION OF PREFERRED EMBODIMENTS OF THE INVENTION

Figure 1:
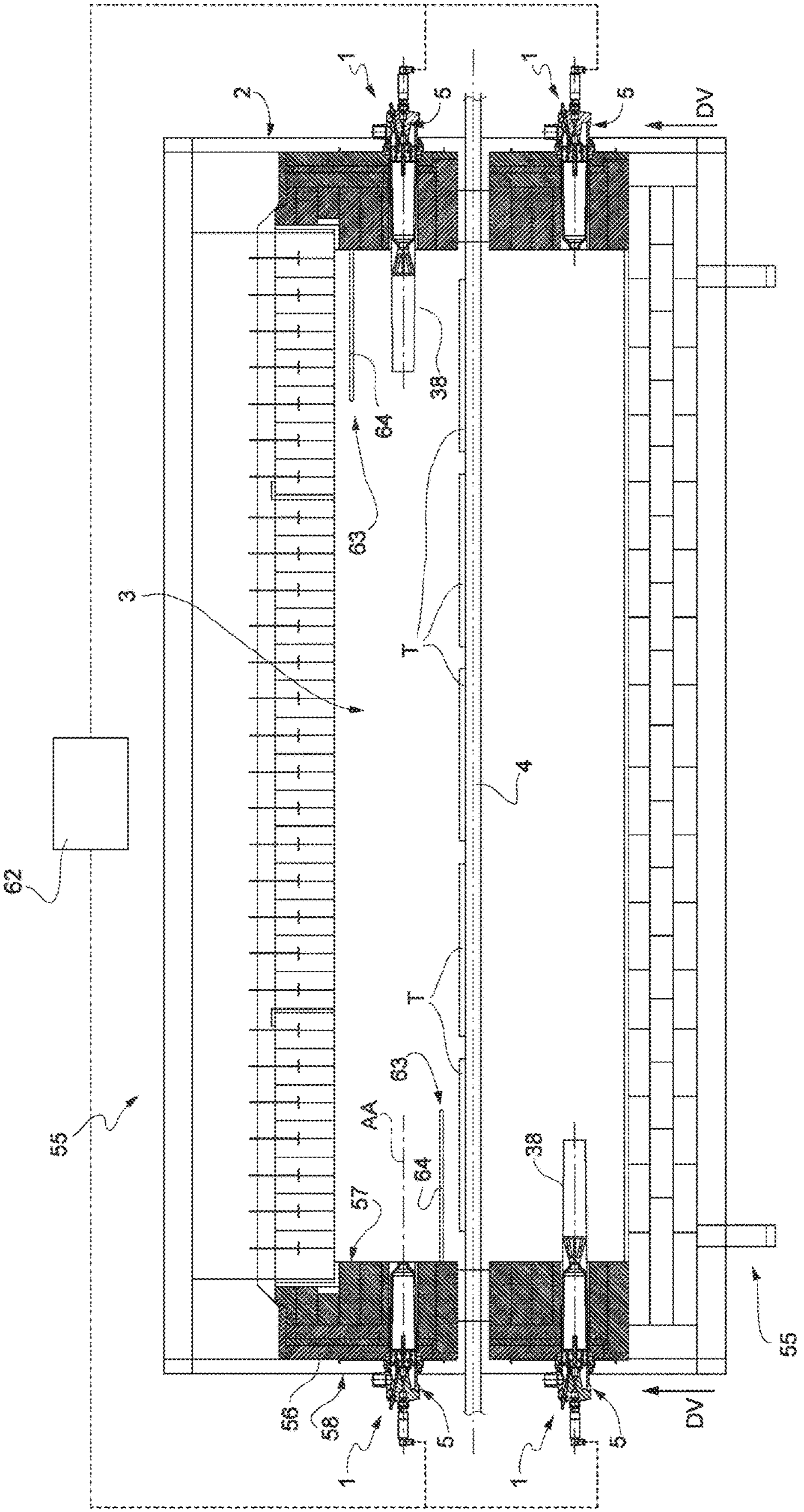
FIG. 1 is a sectional front view of a first embodiment of an apparatus in accordance with the present invention.

In FIG. 1, the reference number 1 indicates as a whole a burner for the firing of ceramic articles T in accordance with a first aspect of the present invention.

The burner 1 is preferably, but not necessarily, installable in an industrial kiln 2, in particular a tunnel kiln, comprising a firing chamber 3.

Figure 2:
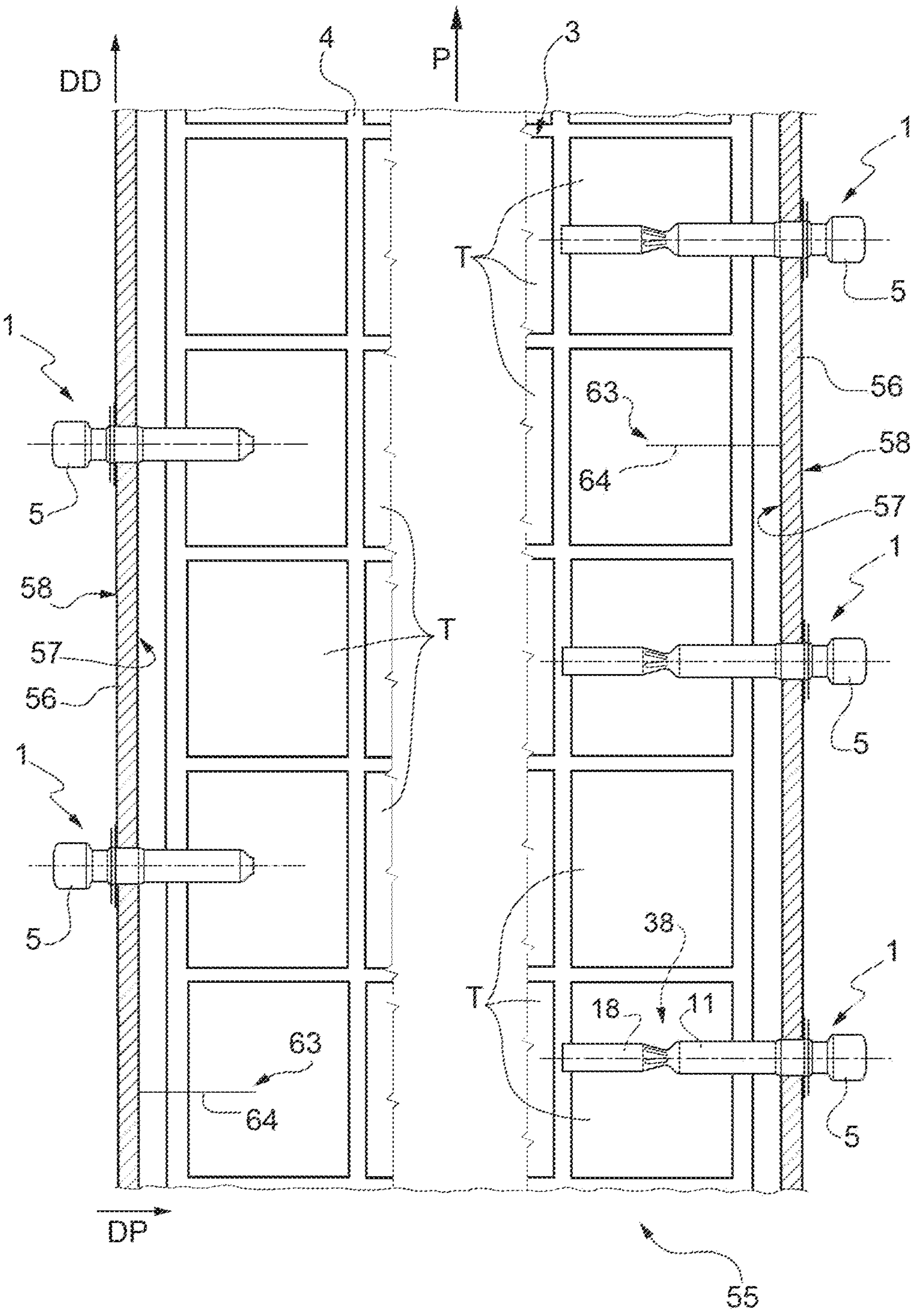
FIG. 2 is a schematic plan view of a portion of a second embodiment of an apparatus in accordance with the present invention.

In particular, as illustrated in FIGS. 1 and 2, the ceramic articles T are moved by a transport system 4 along a conveying path P.

More precisely, the ceramic articles T are any type of ceramic article that requires at least one firing in a kiln.

In the non-limiting embodiment of FIGS. 1 and 2, the transport system 4 comprises a conveyor belt, on which the raw ceramic articles T to be fired are arranged, preferably in an orderly manner.

According to some non-limiting embodiments, not illustrated, the transport system 4 comprises a plurality of ceramic rollers (if necessary also moved at different speeds to differentiate firing of the articles).

Figure 5:
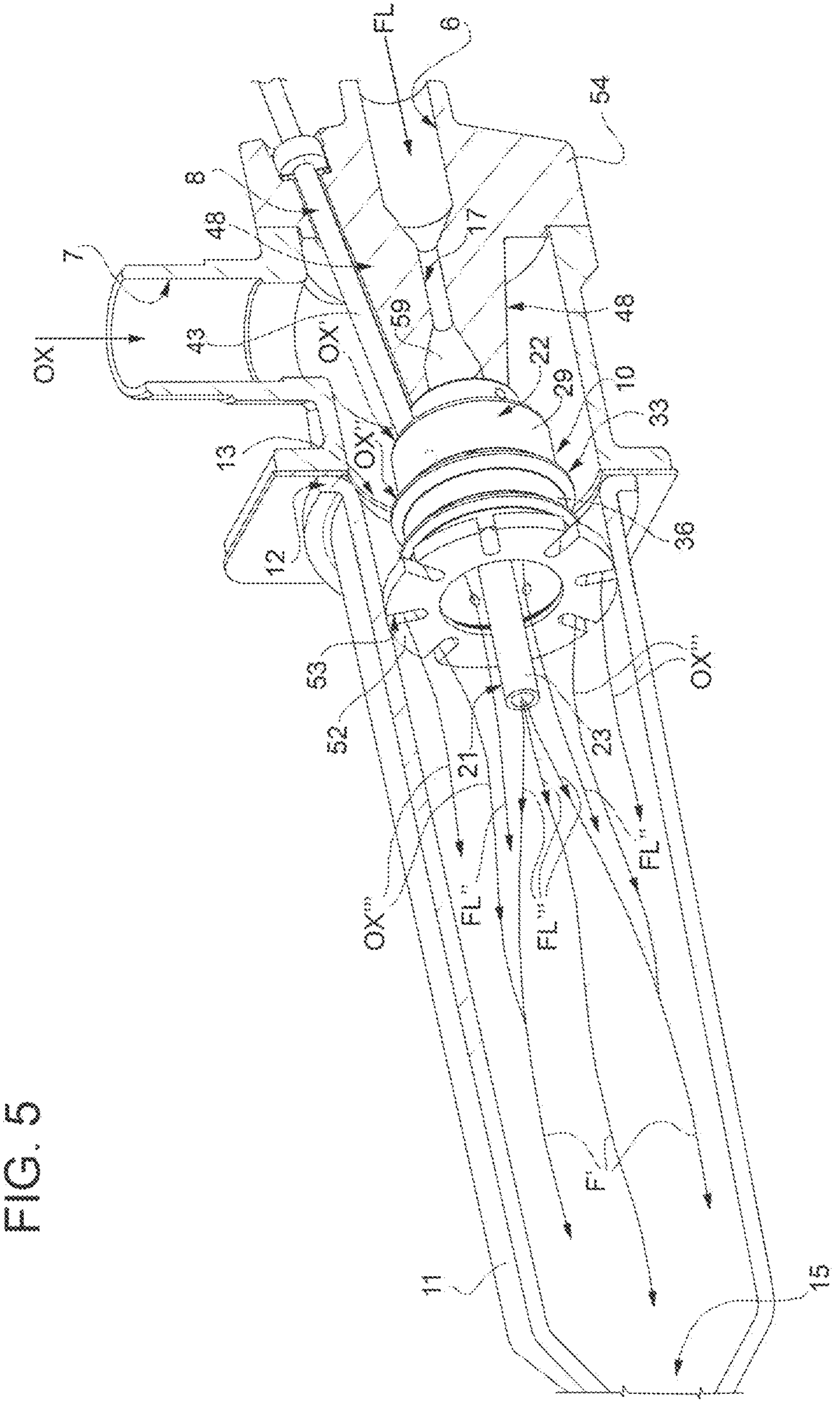
FIG. 5 is a schematic perspective view of a part of the burner of FIG. 4.

As illustrated in FIGS. 1 and 5, the burner 1 comprises a mixing body 5, comprising, in turn, a duct 6 to feed a fuel FL provided with a certain percentage of hydrogen (in particular exceeding 50%, more precisely exceeding 70%), a duct 7 to feed an oxidizer, a spark device 8 to start a combustion and a flame detection device 9. In other words, the mixing body 5 is that part of the burner required to generate the air and gas mixture that (following sparking so as to obtain a flame) will fire the ceramic articles T inside the kiln 2. In particular, the fuel introduced by means of the fuel feeding duct 6 is mainly hydrogen (optionally mixed with natural gas such as methane or LPG), while the oxidizer introduced by means of the oxidizer feeding duct 7 is substantially ambient air (for example, with around 21% of oxygen).

The burner 1 further comprises a tubular discharge element 11, which is designed (configured) to be flowed through by a fluid F flowing out of mixing body 5 (formed by the mixture of fuel and oxidizer and/or a combustion thereof) and is provided with an end 12 having an opening 13, into which at least one part of the mixing body 5 is inserted and an end 14 opposite the end 12 and having an opening 15.

According to some non-limiting embodiments, the mixing body 5 is coupled to the tubular discharge element 11 by means of fastening elements. Advantageously, but not necessarily, as in the embodiment illustrated in FIGS. 4 and 5, the fastening elements are bolts 16.

Figure 3:
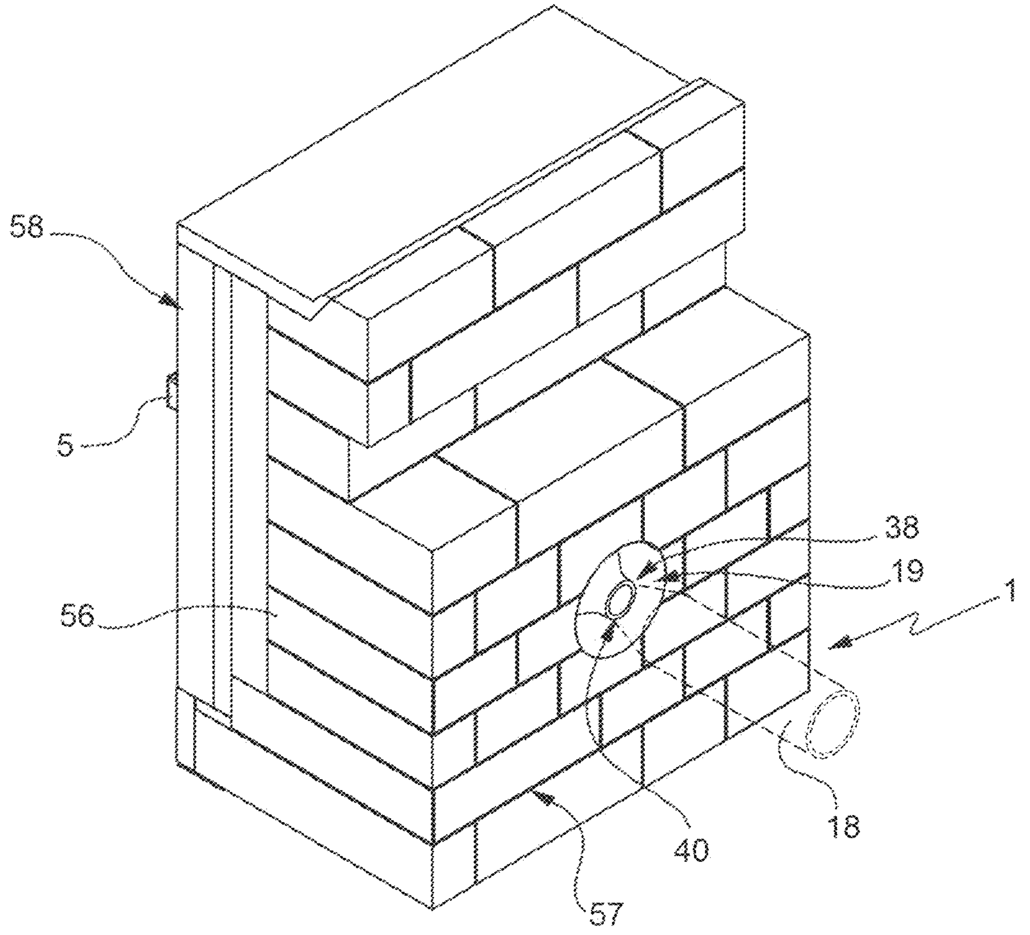
FIG. 3 is a schematic perspective view of part of the apparatus of FIG. 1 comprising a burner in accordance with the present invention.
Figure 4:
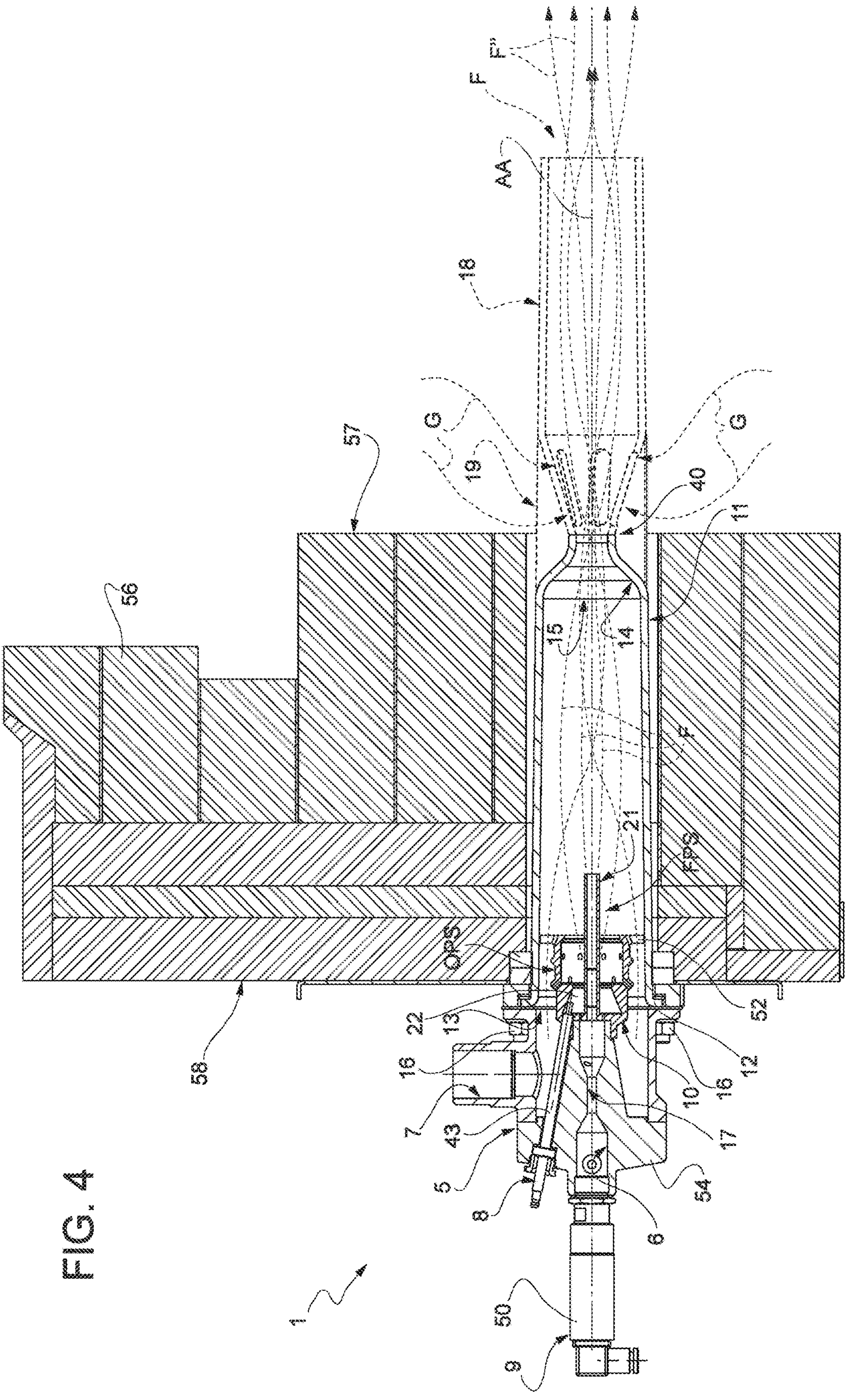
FIG. 4 is a sectional front view of the part of FIG. 3.

In the non-limiting embodiment illustrated in FIGS. 3 and 4, the mixing body 5 is inserted in part into the discharge element 11 and in part is arranged outside the kiln 2. In particular, in the embodiment of FIG. 4, the discharge element 11 is inserted into a side wall 56 of the tunnel kiln 2. More precisely, the discharge element 11 extends completely into the side wall 56. Instead, in other non-limiting embodiments, the discharge element 11 extends for the whole of the length of the side wall 56 also in part entering the firing chamber 3 of the kiln 2.

Advantageously, and as illustrated in the non-limiting embodiment of FIG. 4, the mixing body 5 comprises both a fuel partitioning system FPS for the fuel FL, which is configured to divide the fuel FL into a plurality of portions FL', FL", FL'", and an oxidizer partitioning system OPS for the oxidizer OX, which is configured to divide the oxidizer OX into a plurality of portions OX', OX", OX'" (see, for example, FIG. 5). The burner 1 is configured so that the plurality of portions FL', FL", FL'" and the plurality of portions OX', OX", OX'" are conveyed so as to be mixed together in at least two (in particular three or more) stages (forming the respective mixtures M', M", M'").

Advantageously, but not necessarily, the oxidizer partitioning system OPS comprises a combustion head 10, which is arranged (at least partially) inside the first tubular discharge element 11 (through the opening 13) and comprises one or more combustion chambers 22, 33, configured to each contain a different stage (or mixture M1, M2) of combustion of the flame.

Advantageously, but not necessarily, the fuel partitioning system FPS for the fuel FL comprises an injection element 21, which is configured to inject at least the greatest part FL'" of the fuel FL downstream of the combustion head towards the end 14, i.e., towards the firing chamber 3. In this way, the greatest part of the flame develops far from the end 12 of the burner 1, at the same time allowing the flame front to be moved towards the firing chamber and a reduction of overheating of the mixing body and of the discharge element 11.

In particular, the tubular discharge element 11 is configured to contain a primary stage F' of combustion of the flame.

According to a preferred but non-limiting embodiment illustrated in FIGS. 4 to 9, the injection element comprises a tubular duct 23, in particular an axial one (i.e., arranged parallel to a longitudinal axis AA of the burner), which goes through the one or more combustion chambers 22, 33 from side to side so as to convey the greatest portion FL'" of fuel (exceeding 50%, preferably from 70% to 80%) downstream of the combustion head 10 advancing the greatest part of the flame towards the firing chamber 3.

In the non-limiting embodiments of FIGS. 4 to 9, the tubular duct 23 has a substantially constant, preferably circular, section. In particular, the tubular duct has a first cross section having an inner diameter ranging from 2 mm to 12 mm, in particular from 4 mm to 10 mm. In this way, it is possible to ensure a high speed that favours a reduction/control of flashback that usually causes problems in the case of hydrogen, also helping the rest of the burner to reach the speed required to introduce the flue gases F in depth inside the firing chamber 3.

In some non-limiting cases, the tubular duct 23 is configured (long) so that the end 26' remains inside the tubular discharge element 11. In particular, the tubular duct 23 is configured (long) so as to remain in the half of the tubular discharge element 11 farthest from firing chamber 3 (i.e., the end 14). More in particular, the tubular duct 23 has, between the two ends 26 and 26', a length ranging from 40 mm to 150 mm, preferably from 60 mm to 110 mm.

Figure 6:
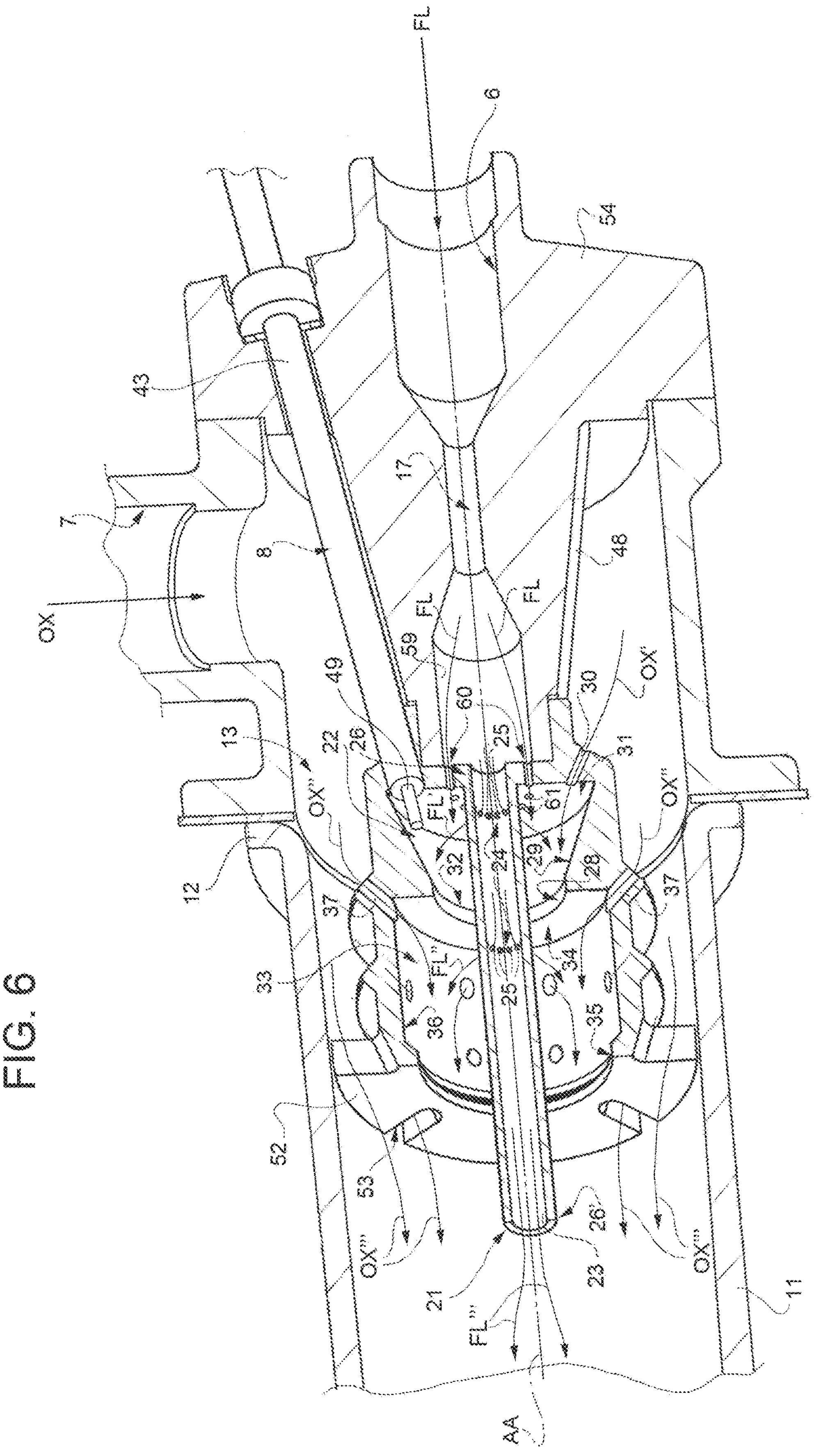
FIG. 6 is a longitudinal section and detail view of the burner of the part of FIG. 5.
Figure 8:
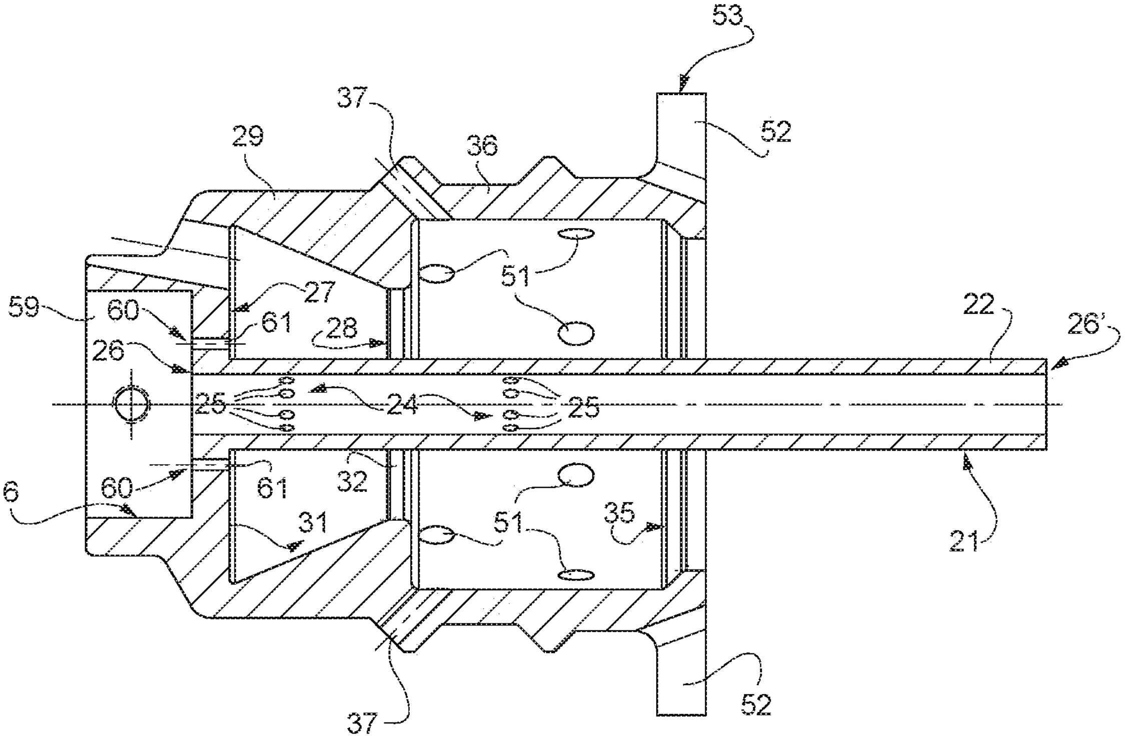
FIGS. 8 and 9 are two sectional front views of part of the combustion head of FIG. 7.
Figure 9:
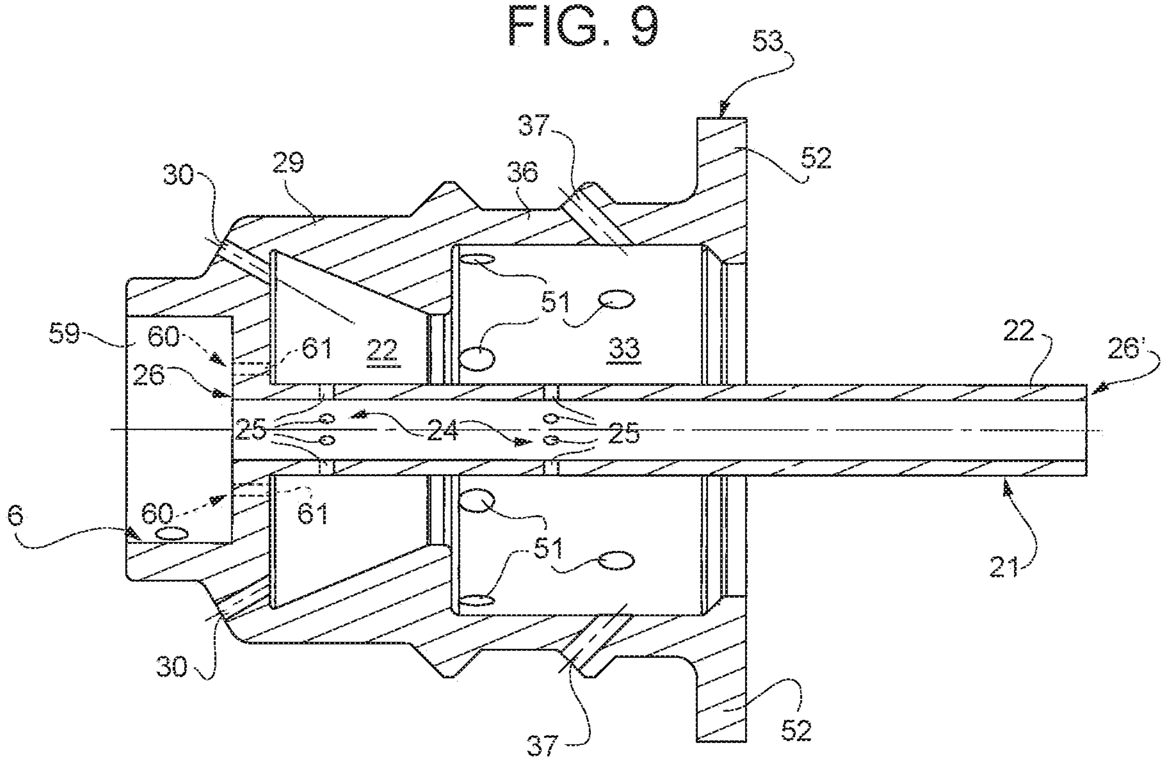

Advantageously, but not necessarily, as illustrated in the non-limiting embodiments of FIGS. 6, 8 and 9, the tubular duct 23 has one or more fuel distribution openings 24 in the area of each combustion chamber 22, 33 so as to inject at least one of the portions FL', FL" into each one of them. In particular, the one or more distribution openings 24 are through holes 25 that connect an inner area of the tubular duct 23 to a combustion chamber 22, 33.

Advantageously, but not necessarily, the through holes 25 are radial holes, preferably ring shaped, for example which extend radially from the axis AA. Preferably, the holes 25 have a diameter smaller than 5 mm, in particular ranging from 1 mm to 3 mm.

In some non-limiting cases, such as the one illustrated in FIGS. 4 to 9, the tubular duct 23 comprises an end 26 connected to the fuel feeding duct 6 for the fuel FL and an end 26' projecting into the tubular discharge element 11 towards the end 14. In particular, the tubular duct 23 extends along a longitudinal symmetry axis AA of the burner 1.

Advantageously, but not necessarily, the fuel feeding duct 6 for the fuel FL comprises at least one narrow portion 17, having an inner diameter smaller than 10 mm, in particular ranging from 4 mm to 8 mm. In particular, the narrow portion 17 has a section smaller than that of the tubular duct 23. In this way, flashback is further prevented.

In some non-limiting cases, not illustrated, the narrow portion 17 is configured to create a Venturi peak, drawing a portion of oxidizer back into the fuel feeding duct so as to add a stage to combustion of the flame.

Advantageously, but not necessarily, the burner 1 (the mixing body 5) comprises a breech 54 (in particular made of aluminium or cast iron and provided with the final part of the fuel and oxidizer feeding ducts 6 and 7) which closes the burner 1 on the opposite side to the firing chamber 3. In particular, the narrow portion 17 is obtained as one single piece on the breech 54 of the mixing body 5. In particular, upstream and downstream of the narrow portion 17, the fuel feeding duct 6 for the fuel FL has countersinks.

In some non-limiting cases, preferably in the presence of high percentages of hydrogen in the fuel FL, the breech 54 of the mixing body 5 has no openings configured to pre-mix oxidizer OX and fuel FL upstream of the oxidizer partitioning system. In other words, the breech 54 comprises a side wall 48 without openings. In this way, the narrow portion 17 has the further action of preventing flashback.

In other non-limiting cases, not illustrated, preferably in the presence of small percentages of hydrogen in the fuel FL, the breech 54 has eccentric holes, thanks to which the narrow portion 17 is configured to create a Venturi peak, drawing a portion of oxidizer back into the fuel feeding duct so as to add a stage to combustion of the flame.

In particular, hydrogen determines much larger flashback compared to methane (or to LPG) and it was surprisingly noted that, by increasing the feed speed of the fuel FL by means of the narrow portion 17, it is possible to adequately prevent flashback, allowing adequate control thereof and at the same time injecting the fluid F more in depth into the firing chamber 3.

Advantageously, but not necessarily, and as illustrated in the non-limiting embodiments of FIGS. 1 to 4, the burner 1 comprises a tubular discharge element 18 (illustrated, for example, with a dashed line in FIG. 4), which extends from the end 14 of the element 11 in the opposite direction relative to the end 12, i.e., towards (more precisely, inside of) the firing chamber 3. In other words, the discharge element 18 is arranged on the opposite side of the discharge element 11 relative to the mixing body 5.

In some non-limiting cases, the burner 1 comprises a suction element 19 which is designed (configured) to lead at least part of the gases G present outside the burner 1, in particular outside the discharge element 11 and/or the discharge element 18 (more precisely inside the firing chamber 3), into the tubular discharge element 18 and is provided with a plurality of openings 20 arranged between the tubular discharge element 11 and the tubular discharge element 18.

Advantageously, but not necessarily, the tubular discharge element 14 is (completely) located inside the firing chamber 3 and, for example, is coaxial to the tubular discharge element 11. In other words, the longitudinal symmetry axis AA of the tubular discharge element 18 coincides the longitudinal axis of symmetry AA of the tubular discharge element 11.

Advantageously, and in a manner completely different from than standards used in the ceramic market, the combustion head 10 is a multistage combustion head, i.e., designed (configured) to divide the formation of the flame into various stages. In this way, it is possible to use the "air staging" technique.

Advantageously, and in a manner very different from the standards used in the ceramic market, the duct 23, together with the openings 24, helps the combustion head 10 to divide the flame into different stages, in particular dividing the fuel FL. In this way, it is possible to use the "fuel staging" technique.

From the combination of the aforesaid techniques, it is possible to use the fuel FL with a substantial percentage of hydrogen and at the same time increase the flame speed to over 160 m/s, in particular to over 180 m/s, more precisely up to around 200 m/s. In fact, the term "high velocity" is meant, specifically in the field of burners, as a flame speed equal to or greater than 150 m/s.

Advantageously but not necessarily, the combustion head 10 (with the tubular duct 23 inside it) is mounted at least partially inside the tubular discharge element 11 so as to be coaxial with it along the longitudinal symmetry axis AA of the burner 1.

As illustrated in the non-limiting embodiments of FIGS. 4 to 9, advantageously, the multistage combustion head 10 comprises (at least) a combustion chamber 22, which is designed (configured) to generate a first phase of combustion of the flame (in particular to generate the "root" of the flame) given by the combination of the portions FL' and OX', and (at least) a combustion chamber 33, communicating with the combustion chamber 22 and designed (configured) to generate a second phase of combustion of the flame (given by the combination of the portions FL" and OX") flowing out of the combustion chamber 22. In particular, the combustion chambers 22 and 33 are configured to convey a secondary portion F" (or secondary state) of the flame into the tubular discharge element 11 towards the end 14 and in particular, through the suction element 19 towards the tubular discharge element 18.

In the non-limiting embodiment of FIGS. 8 and 9, in which two sections of the multistage combustion head 10 are illustrated in detail, the combustion chamber 22 comprises at least one inlet opening 27 and one outlet opening 28 (more precisely arranged on opposite sides of the combustion chamber 22).

In some non-limiting preferred cases, the burner 1 comprises further openings 60 for feeding the fuel FL (in particular the portion FL') connecting the fuel feeding duct 6 for the fuel FL to the combustion chamber 22. In particular, the further openings 60 for feeding the fuel FL comprise axial through holes 61, preferably arranged like a crown (along mutually parallel directions) around the longitudinal symmetry axis AA of the burner 1. More in particular, the further openings 60 are made on the inlet opening 27, which is designed (configured) to be communicating with the fuel feeding duct 6 for the fuel FL and to receive a volumetric flow rate, more precisely variable, of said fuel FL. Preferably, the holes 25 have a diameter smaller than 5 mm, in particular ranging from 1 mm to 3 mm.

The outlet opening 28 is facing towards the tubular discharge element 18 (i.e., towards the firing chamber 3).

Advantageously, but not necessarily, downstream of the narrow portion 17, but upstream of the combustion chamber 22, the mixing body comprises a first distribution chamber 59, which is configured to inject part of the fuel FL that passes into it through the further openings 60 and the remaining part into the tubular duct 23 through the end 26.

In some non-limiting cases, the combustion chamber 22 and the combustion chamber 33 are coaxial to each other and arranged along the longitudinal axis AA of the burner 1.

Advantageously, but not necessarily, the combustion chamber 22 comprises a side wall 29 having a substantially circular cross section. In particular, the cross section of the side wall 29 converges radially as it approaches the outlet opening 28.

Advantageously, but not necessarily, the combustion chamber 22 is provided with one or more channels 30 to feed the oxidizer OX, configured to convey a part OX' of the oxidizer OX into the combustion chamber 22 generating, together with the portion FL' of the fuel FL, an oxidizer-fuel mixture M'.

In particular, the channels 30 to feed the oxidizer OX are made so as to introduce the part OX' of the oxidizer OX into the combustion chamber 22 with a speed at least partially transverse relative to a main direction of the fuel corresponding substantially to the longitudinal axis AA of the burner.

According to the non-limiting embodiment of FIG. 8 or 9, the side wall 29 of the combustion chamber 22 is substantially truncated-cone shaped comprising a larger base 31 and a smaller base 32, in which the larger base 31 is arranged in the area of the inlet opening 27, while the smaller base 32 is arranged in the area of the outlet opening 28.

Advantageously, but not necessarily, the channels 30 to feed the oxidizer OX are made so as to introduce the part OX' of the oxidizer OX into the combustion chamber 22 with a speed having a direction substantially parallel to the side wall 29 of the second combustion chamber.

In the non-limiting embodiment of FIGS. 4 to 9, the burner 1 comprises a combustion chamber 33 arranged downstream of the combustion chamber 22 and provided with an inlet opening 34 and an outlet opening opposite each other. The inlet opening 34 is configured to be communicating with the outlet opening 28 and to receive the oxidizer-fuel mixture M'. In particular, the outlet opening 35 is facing towards the tubular discharge element 18 (i.e., towards the firing chamber 3). More precisely, the combustion chamber 33 comprises a side wall 36 having a substantially circular cross section, in particular cylindrical (i.e., constant parallel to the longitudinal axis AA of the burner 1), and provided with one or more channels 37 to feed the oxidizer OX configured to allow the introduction of a part OX" of the oxidizer OX into the combustion chamber 33 generating, together with the oxidizer-fuel mixture M', a oxidizer-fuel mixture M", which is generated inside the combustion chamber 33 and is conveyed towards the tubular discharge element 18 (i.e. towards the firing chamber 3).

Figure 7:
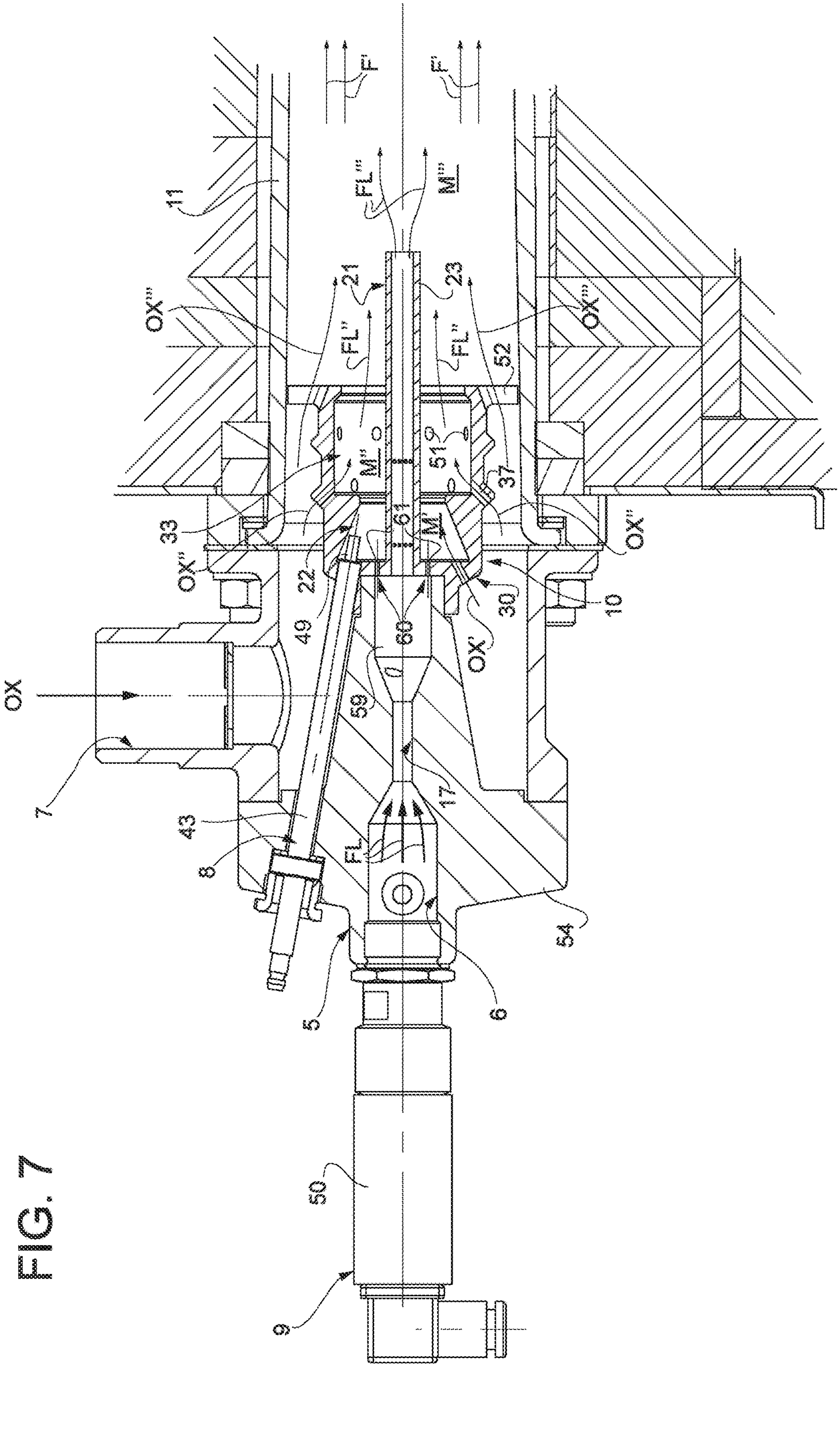
FIG. 7 is a sectional front view of a combustion head of the burner of FIG. 5.

In the non-limiting embodiment of FIGS. 4 to 9, in particular as indicated in FIG. 7, the channels 30 to feed the oxidizer have inclinations differing from one another, for example, by an angle substantially equivalent to 30°, or 20°. In this case, the side wall 29 of the combustion chamber 22 and the channels 30 to feed the oxidizer OX are substantially parallel. Obviously, the above can also be applied to the channels 37 to feed the oxidizer OX.

Advantageously, but not necessarily, the combustion chamber 33 comprises, on the side wall 36, a plurality of holes 51 arranged in one or more radial rows, preferably at the same radial distance from one another.

In the non-limiting embodiment of FIG. 6, the combustion head 33 comprises a crown 52 configured to regulate the introduction of the oxidizer OX into the tubular discharge element 11 that does not pass through the combustion chambers 22 and 33. In particular, the crown 52 extends from the edge of the outlet opening 35 towards (up to) the inner wall of the tubular discharge element 11.

Advantageously, but not necessarily, and as illustrated in the non-limiting embodiment of FIG. 6, the crown 52 comprises slots 53 (or any other type of opening) configured to convey a part OX'" of the oxidizer into the tubular discharge element 11 downstream of the combustion chambers 22 and 33. In this way, together with the oxidizer-fuel mixture M", and with the main portion FL'" of the fuel, a mixture M'" is generated flowing out of the tubular discharge element 11, through the suction element 19 towards the tubular discharge element 18. In particular, the primary flame F' of the burner 1 is generated.

Advantageously, not but necessarily, and as illustrated in the non-limiting embodiments of FIGS. 1 to 4, the suction element 19 is designed (configured) to be arranged, at least partially (in some cases completely), inside the firing chamber 3.

Figure 11:
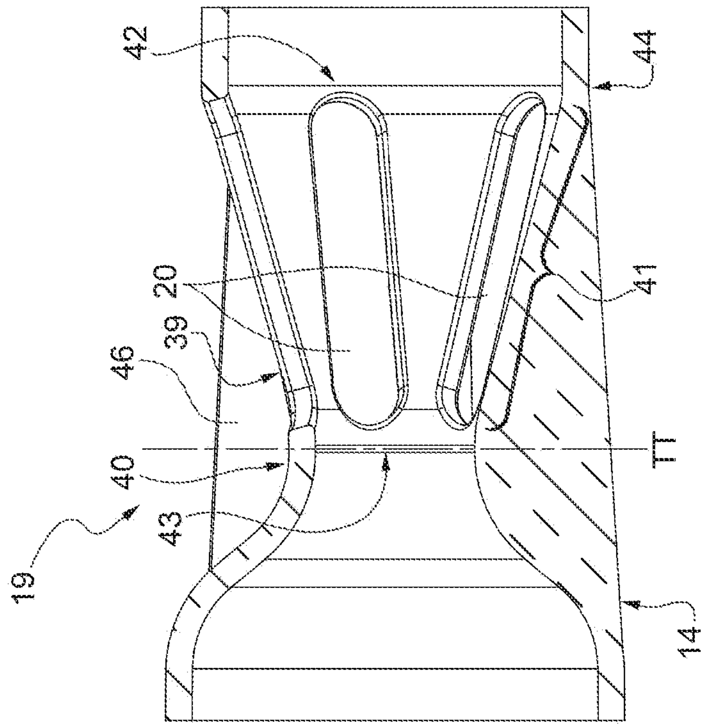
FIG. 11 is a sectional lateral view of a part of the discharge body of FIG. 10.
Figure 10:
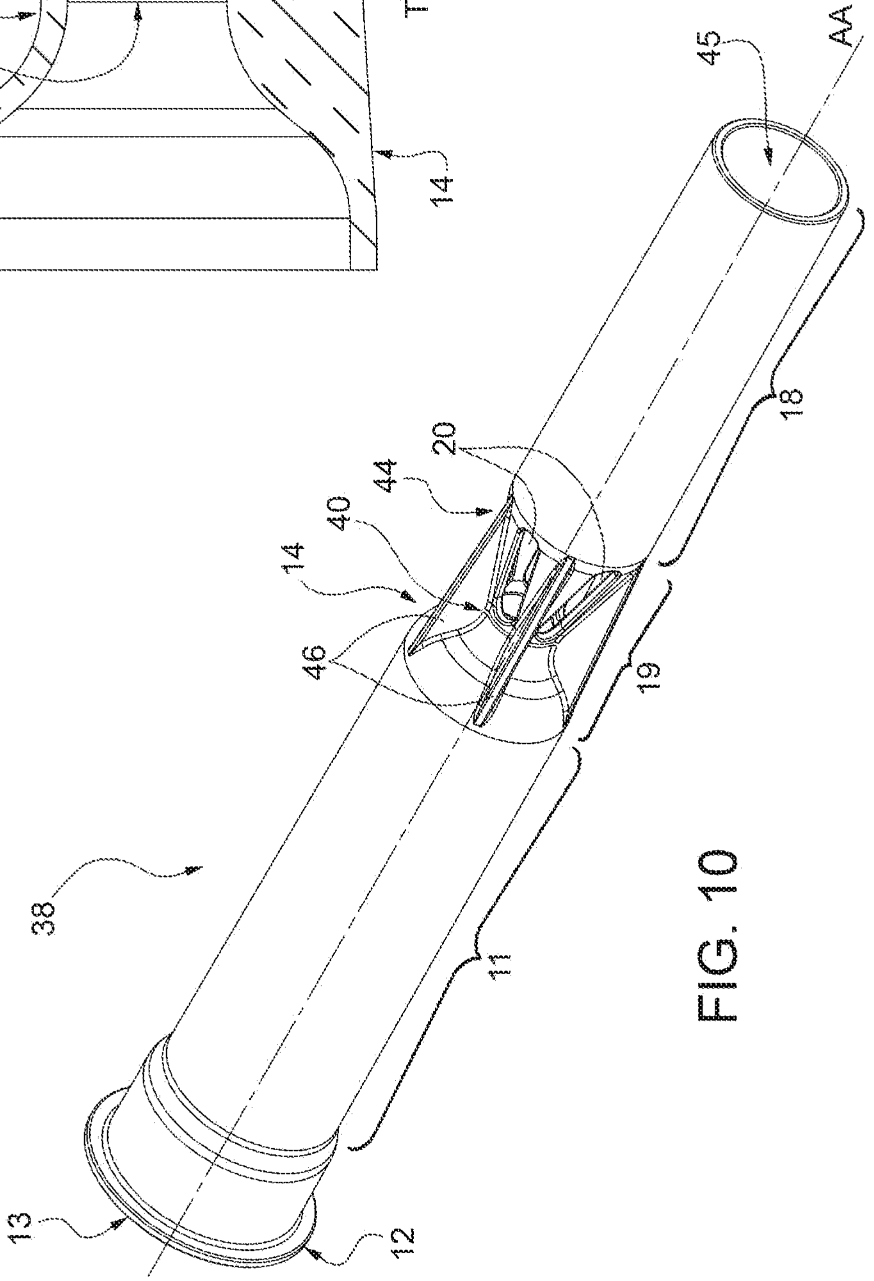
FIG. 10 is a schematic perspective view of a part of a burner in accordance with the present invention.

In the non-limiting embodiments of FIGS. 4, 10 and 11, the tubular discharge element 11, the tubular discharge element 18 and the suction element 19 together form a combustion block 38 illustrated schematically as a whole in FIG. 10. In particular, a lateral surface 39 of the combustion block 38 is (at least) partially seamless. More in particular, the lateral surface 39 of the combustion block 38 is seamless in the sections not interrupted by the openings 20.

Advantageously, but not necessarily, the combustion block 38 is produced as one single piece, in particular made of silicon carbide. More precisely, the longitudinal symmetry axis of the combustion block 38 is the longitudinal symmetry axis AA of the burner 1, of the tubular discharge elements 11 and 18 and of the multistage combustion head 10.

Advantageously but not necessarily, the combustion block 38 is produced by additive manufacturing, in particular 3D printing.

According to further non-limiting embodiments, the combustion block 38 is formed through techniques of casting in moulds.

In the non-limiting embodiments illustrated in the accompanying figures, the combustion block 38 is hollow and is designed (configured) to allow the passage of a mixture (in particular of the mixture M'") generated by the mixing body 5 (i.e., by the combustion head 10). In particular, said mixture M', M", M'", once combustion has been sparked, becomes a flame.

According to some non-limiting embodiments, the suction element 19 comprises, in particular is, a Venturi tube.

In the non-limiting embodiment of FIGS. 10 and 11 (where FIG. 11 illustrates a detail of the suction element 19 of the embodiment of FIG. 11), the suction element 19 has narrowing 40 arranged in the area of the end 14. Moreover, the suction element 19 has at least one truncated-cone shaped portion 41, delimited by a larger base 42 and a smaller base 43. Finally, the tubular discharge element 1 has an open end 44 facing towards the suction element 19 and an open end 45 facing towards the centre of the firing chamber 3.

Advantageously, but not necessarily, the openings 20 have an elongated shape, i.e., are slots, and pass through the truncated-cone shaped portion 41 of the suction element 19 from side to side (transversely). In particular, the openings 20 are obtained longitudinally to the tubular discharge element 11 and to the tubular discharge element 18.

More in particular, the smaller base 43 of said truncated-cone shaped portion 41 coincides with the narrowing 40, while the larger base 42 of the said truncated-cone shaped portion 41 coincides with the open end 44.

Advantageously, but not necessarily, the openings 20 are made on the truncated-cone shaped portion 41 of the suction element 19. In particular, they pass through the truncated-cone shaped portion 41 of the suction element 19 from side to side (transversely).

Advantageously but not necessarily, and as illustrated in FIGS. 4, 10 and 11, the suction element 19 comprises reinforcing ribs 46. Thanks to these ribs 46, it is possible to extend the discharge element 18 as desired with the risk of the combustion block 38 breaking in the area of the portion with smaller section, i.e., in the area of the suction element 19.

Advantageously, but not necessarily, the suction element 19 has a circular cross section.

Advantageously, but not necessarily, the suction element 19 has a circular cross section with a substantially variable diameter.

In particular, the cross section TT (FIG. 11) of the narrowing 40 has a diameter smaller than two thirds of the diameter of the discharge element 18 and of the diameter of the discharge element 11. More in particular, the cross section TT (FIG. 11) of the narrowing 40 has a diameter smaller than half the diameter of the discharge element 18 and of the diameter of the discharge element 11. The more the diameter of the narrowing 40 decreases, relative to the diameter of the discharge element 11, the more the variation of the speed of the mixture M''' which, in use, circulates inside the discharge element 11, increases.

Advantageously, but not necessarily, the cross section TT (FIG. 11) of the narrowing 40 has a diameter smaller than one third of the diameter of the discharge element 18 and of the diameter of the discharge element 11. In particular, the cross section TT (FIG. 11) of the narrowing 40 has a diameter larger than one sixth of the diameter of the discharge element 18 and of the diameter of the discharge element 11.

Advantageously but not necessarily, the diameter of the narrowing 40 is smaller than 30 mm, in particular equal to or smaller than 25 mm. In detail, the diameter of the narrowing 40 ranges from 5 mm (in particular from 10 mm; more in particular from 20 mm) to 60 mm (in particular to 40 mm; more in particular to 30 mm). Also this feature allows the prevention of flashback and consequently better management of combustion with mixtures of fuel FL that are very rich in hydrogen.

Advantageously, but not necessarily, the diameter of the discharge element 11 and the diameter of the discharge element 18 ranges from 20 mm (in particular from 40 mm; more in particular from 50 mm) to 200 mm (in particular to 120 mm; more in particular to 100 mm).

According to a preferred but non-limiting embodiment, as illustrated in FIGS. 4-7, the spark device 8 comprises a sparking electrode (in particular parallel to the side wall 48 of the breech 54) and the flame detection device 9 comprises a UV detection probe 50. In particular, the UV probe 50 is arranged along the longitudinal axis AA of the burner on board the breech 54, i.e., on board the mixing body 5.

Advantageously, but not necessarily, the flame detection device 9 (more precisely the UV detection probe 50) is configured so as to receive a UV beam (ultraviolet radiation) coming from the flame that passes through the tubular discharge element 11. In use, the UV detection probe 50 provides data relating to the state of the flame generated by the burner, through which it is possible to appropriately regulate the flow rate of the fuel FL and/or of the oxidizer OX. Moreover, in the case of flameless combustion, the UV probe 50, when operating at full capacity, is disabled as it is no longer able to detect any flame, as the flame front is diluted inside the firing chamber of the kiln.

In accordance with a second aspect of the present invention, an industrial apparatus 55 is provided for the firing of ceramic articles, in particular according to the preceding description.

With particular reference to FIGS. 1 and 2, an industrial apparatus in accordance with the present invention is indicated as a whole with the number 55.

According to some non-limiting embodiments, the ceramic articles T are, once fired, tiles. In particular, the ceramic articles T are raw at the inlet to the apparatus 55 and fired at the outlet.

The industrial apparatus 55 comprises the kiln 2 (described above), in particular a tunnel kiln, provided with at least one side wall 56 that delimits the firing chamber 3 and has an inner surface 57 on the inside of the firing chamber 3 and an outer surface 58 on the outside of the firing chamber 3.

The industrial apparatus 55 further comprises the transport system 4 described above, in particular horizontal, which is configured to convey the plurality of ceramic articles T along the conveying path P inside the firing chamber 3 (from the inlet to the outlet of the firing chamber 3).

The apparatus 55 comprises a burner 1, which comprises, in turn, a tubular discharge element 11, and preferably, but not necessarily, a tubular discharge element 18 and a suction element 19 of the gases G.

Advantageously, but not necessarily, the apparatus 55 comprises a (hydrogen) burner 1 according to the preceding description.

Advantageously, the apparatus 55 comprises a hydrogen feeding system configured to inject hydrogen or a mixture comprising hydrogen into the feeding duct 6 for the fuel FL.

Advantageously but not necessarily, the suction element 19 is arranged between the discharge element 11 and the discharge element 18 and is arranged at least partially (in some non-limiting cases also completely) inside the firing chamber 3.

In particular, the suction element 19 is configured to lead at least part of the gases G present in the firing chamber 3 into the discharge element 18. In this way, it is possible to use the residual oxygen inside the firing chamber 3 and complete the combustion of those gases G that have not been totally burned with a first passage inside the burner 1, i.e., by means of a primary combustion F'. Moreover, the gases G (presumably, also in view of the fact that they have a relatively high temperature) contribute to improving the efficiency of combustion.

"Primary combustion" is meant as the combustion generated by the mixing body 5 (in particular by the combustion head 10), whose flame flows through the discharge element 11.

Advantageously, but not necessarily, and as illustrated in the non-limiting embodiment of FIG. 4, the suction element 19 is arranged in the area of the inner surface 57 of one of the side walls 56.

In particular, the suction element 19 is configured to create a depression between the discharge element 11 and the discharge element 18 so as to lead at least part of the gases G present in the firing chamber 3 into the discharge element 18. In other words, in the non-limiting embodiments illustrated in the accompanying figures, the depression is generated by Venturi effect. The high flame speed generated by the multistage combustion head 10 determines the surprising synergic effect of increasing the suction capacity of the suction element 19.

According to the non-limiting embodiment of FIG. 2, the apparatus 55 comprises a plurality of burners 1 arranged in series along a direction DD parallel to the conveying path P. In particular, the burners 1 are arranged on several levels inside at least one of the walls 56 of the kiln 2.

In the non-limiting embodiments of FIGS. 1 to 4, the burner 1 is coupled, by means of fastening elements, to the wall 56 of the kiln 2. In particular, the discharge element 11 is inserted into the wall 56.

In the non-limiting embodiment of FIG. 1, the burners 1 are oriented in a direction DP transverse (in particular, perpendicular) to the direction DD (and hence to the conveying path P).

Advantageously, but not necessarily, the tubular element 11 of the burner 1 is installed so as to pass through, at least partially (in particular completely and transversely) one of the side walls 56 of the kiln 2. In this way the flame produced by the burner 1 will flow directly towards the inside of the firing chamber 3 of the kiln 2.

In particular, the axis AA is perpendicular to the conveying path P. More in particular, the axis AA is also perpendicular to the side wall 56 of the industrial tunnel kiln 2.

Advantageously, but not necessarily, the tubular discharge element 1 of the burner 1 is arranged substantially completely inside the firing chamber 3.

According to some non-limiting embodiments, not shown, the discharge element 11 of the burner 1 is installed so as to project partially into the firing chamber 3.

Advantageously, but not necessarily, the openings 20 are arranged at least partially (in particular completely) inside the firing chamber 3.

Advantageously, but not necessarily, the apparatus 55 (or each burner 1) comprises at least one electronic control unit 62 configured to control the burner 1 so as to shift from a firing configuration with flame to a flameless firing configuration of the firing chamber 3. In particular, the electronic control unit 62 is configured to shift from mode with flame to flameless mode upon reaching a predefined temperature. More precisely, the predefined temperature is higher than the self-ignition temperature of the fuel mixture. By means of this cyclical (intermittent) control of the feed of oxidizer OX and of fuel FL to the burner 1 it is possible to produce flameless combustion also with fuels such as hydrogen, which tend to reform the flame front suddenly and undesirably inside the burner in the case in which flameless mode extends in time even at low capacities (where a reduction in the intensity of the pulse of the flame causes the occurrence of conditions suitable to form the flame front).

In particular, the electronic control unit 62 is configured to, cyclically, during the flameless firing configuration, decrease (preferably interrupt) the feed of fuel FL and optionally of oxidizer OX, selectively inhibit flame control (by means of the detection device 9) and restore the feed of fuel FL and optionally of oxidizer OX allowing the burner 1 to fire in flameless mode. Using a flameless combustion, i.e., a combustion that exploits the fact that the temperature inside the kiln is greater than the self-ignition temperature of the fuel, it is in fact possible to drastically reduce the emissions of NOx normally generated in the combustion of hydrogen rich mixtures (and in general by combustions with high flame peaks), thus allowing the use of an environmentally sustainable fuel with low emissions. In particular, the alternating combination of flame mode and flameless mode makes it possible to offset the high ignitability and propagation (flashback) of hydrogen.

In particular, but without limitation, the electronic control unit 62 is configured to control the apparatus 55 so as to fire the tiles T only in the flameless configuration.

Advantageously, but not necessarily, and as illustrated in the non-limiting embodiment of FIG. 1, the apparatus 55 comprises at least two temperature control devices 63, in particular at least two thermocouples 64 with dual filament, arranged in at least two different "significant" points of the kiln 2. These two points are such as to be able to ensure that the temperature is sufficiently higher than the self-ignition temperature of the fuel mixture in all points of the firing chamber.

Advantageously, but not necessarily, in the case in which the temperature detected by the two thermocouples 64 drops below the self-ignition temperature, the flame is sparked and ignited once again, i.e., the electronic control unit 62 immediately restores the operating mode of the burner 1 with flame.

According to a further aspect of the present invention, a method is provided for the firing of ceramic articles conveyed inside a tunnel kiln.

The method comprises at least a step of supplying a burner according to the preceding description with a fuel comprising at least a percentage of hydrogen exceeding 20%, in particular exceeding 50%, more in particular exceeding 70%. These fuel mixtures are made possible by the particular geometry of the burner described above, in particular thanks to the multistage combustion head 10 in combination with the injection element 21. Moreover, the dimensions of the narrow portion 17, the geometry of the chambers 22 and 33, i.e., the size and the number of the openings 24 and 60, and the tubular discharge element 1 and the suction element 19, synergically determine the important technical effect of reducing the environmental impact, allowing the use of a hydrogen rich mixture as fuel and a reduction of NOx, respectively.

In some non-limiting cases, the fuel FL comprises a percentage of hydrogen exceeding 90%. In particular, the fuel is 100% hydrogen.

The method further comprises the step of simultaneously feeding the burner 1 with oxidizer OX and sparking (igniting) the flame (by means of the spark device 8) that extends at least partially inside the burner and the firing chamber 3 of the kiln 2.

Once ignition of the flame has been completed, the method provides for controlling the flame in feedback thanks to the detection device 9.

Advantageously, but not necessarily, the method comprises the further steps of, once the firing chamber 3 of the kiln 2 has reached a predefined temperature (in particular exceeding the self-ignition temperature of the fuel FL), cyclically putting out the flame by decreasing (or interrupting) the feeding of fuel FL and, if necessary, of oxidizer OX; preferably disabling the aforesaid feedback control of the flame; restoring the feeding of fuel FL, in particular also of oxidizer, generating inside the tunnel kiln 2 a flameless combustion that fires the ceramic articles T. In these non-limiting cases, this alternating step of flameless combustion (the burner 1 is fed alternately and cyclically) represents firing at full operating capacity of the kiln 2. In particular, the method provides for shifting from the mode with flame to the flameless mode upon reaching a predefined temperature. More precisely, the predefined temperature exceeds the self-ignition temperature of the fuel mixture.

Advantageously, but not necessarily, the method provides for firing of the tiles T only after reaching the flameless configuration. In other words, the burner 1 is fed with oxidizer OX and fuel FL "cyclically" without sparking the flame, energizing and de-energizing (opening and closing) simultaneously a fuel solenoid valve (in particular two solenoid valves in series according to current legislation) and an air solenoid valve. In particular, the steps of energizing and de-energizing the solenoid valves (i.e., of feeding and interrupting oxidizer and fuel) are preferably carried out after the electronic control unit 62 has put out the flame in the burner 1 and inhibited the sparking electrode 49 and the UV detection probe 50 of the flame (flame front no longer located in the burner 1 but diluted in the chamber 3 of the kiln). More in particular, by means of the aforesaid solenoid valves, the feeding of oxidizer OX and fuel FL is controlled digitally (ON/OFF), i.e., shifting from the maximum flow rate to zero and vice versa. In this way, it is possible to prevent the formation of a steady flame front anchored inside the burner 1. In detail, this effect is due to the fact that a very high pulse is given to feeding of the flame, such as prevent the formation of the flame front in the burner and which is therefore diluted directly in the firing chamber 3.

In other non-limiting cases, in accordance with the same principle explained above, the method provides for, by means of the control unit 62, maintaining the supply of oxidizer OX and cyclically feeding and interrupting only the supply of fuel FL. In this way, it is possible to maintain the pressure state in the chamber 3 of the kiln 2 constant, without oscillating of the draught of the flue. Moreover, a possible re-sparking of the flame front inside the burner 1 is further prevented.

In the flameless step, this is diluted directly in the chamber of the kiln with the combustion products already present in the chamber 3 with an oxygen content lower than that of the combustion air. In other words, in this way, the oxidizer/fuel mixture flowing out from the burner 1 towards the firing chamber 3 is oxidized inside the chamber 3.

In this way, it is possible to prevent the presence of temperature peaks (which are among the main causes of NOx production) relative to conventional solutions only with flame. This in turn causes a reduced thermal load on the components of the burner 1 (for example on the combustion head 10, on the tubular duct 23, on the mixing body 5, on the combustion block 38, on the fuel and oxidizer pipes, etc.). Simultaneously, a substantial reduction of the heat loss caused by the burner is obtained, thus improving the efficiency of the kiln 2. Moreover, without a flame the burner 1 will be quieter, thus also reducing the noise pollution produced by it.

Finally, the greater speed reached by the narrow portion 17 in combination with the tubular duct 23 for preventing increased flashback by the hydrogen allows an increase in the penetration of the flue gases flowing out of the burner 1 into the firing chamber 3, which determines a greater uniformity in the firing of the articles T.

In use, the spark device 8 (in particular the sparking electrode) generates a spark that together with the fuel FL flowing in from the duct 6 and with the oxidizer OX flowing in from the duct 7 determines generation of the flame. In particular, the part OX' of the oxidizer and fuel FL' generate the mixture M' inside the combustion chamber 22, which defines a first stage of the flame and continues towards the combustion chamber 33, inside which the mixture M', the portion FL" of the fuel and the part OX" of the oxidizer form the mixture M", which defines a second stage of the flame. The mixture M" enters inside the tubular discharge element 11, in which it mixes with the part OX'" of the oxidizer OX and with the portion FL'" of the fuel FL flowing out of the end 26' forms the fluid F (and the primary flame F'). Therefore, the mixing body 5 generates a mixture at least partially burnt, i.e., a flame, the fluids F of which pass through the discharge element 11, which introduces them into the suction element 19, which in turn conveys them (together with the gases G drawn from inside the firing chamber 3) into the discharge element 18. This latter introduces the flame into the combustion chamber 3.

The combustion products emitted from the burner 1 are not totally burnt during their first passage through the discharge element 11, but combustion is increased (completed) thanks to continuous recirculation of the gases G (present inside the firing chamber 3) through the suction element 19 into the discharge element 18. In other words, the burner 1 generates, by means of the spark device 8, a primary combustion on the gases introduced by the ducts 6 and 7 (fuel and oxidizer) and a secondary combustion thereof, exploiting the gases G recirculated from inside the firing chamber 3 not completely burnt (in which residual oxygen is present) drawn by the suction element 19. In particular, primary combustion takes place inside the discharge element 11 and secondary combustion takes place inside the discharge element 18.

In the non-limiting embodiments illustrated in the accompanying figures, the suction element 19 (due to the high speed of the fluid F generated by the mixing body 5) determines an increase of the turbulent motions inside the firing chamber 3. Moreover, the secondary combustion that takes place inside the discharge element 18 generates a further increase of heat exchange, in particular through irradiation, due to heating of said discharge element 18. This results in an increase of the total heat exchange coefficient on the ceramic articles T and a greater homogeneity of the temperature inside the firing chamber 3.

Therefore, it is evident that, using an apparatus 55 or an assembly of burners 1 in accordance with the present invention, greater uniformity of the temperature is obtained along the width of the firing chamber 3 of the kiln 2. In particular, the temperature in proximity of the wall 3 is considerably increased thanks to the turbulences generated by the suction element 19 (thanks to the further speed permitted by the multistage combustion head 10) and to the contribution of the irradiation provided by the discharge element 18 in proximity of said wall 3. Moreover, the temperature in the centre of the kiln is increased relative to conventional solutions, due to the use of the discharge element 18, which allows the combustion block 38 to reach great depths inside the kiln 2. Therefore, the flame exiting from said discharge element 14 is emitted more in depth relative to conventional solutions.

It is important to note that also the temperature peak in proximity of the outlet of the burner 1 is (at least partially) flattened.

Although the invention described above refers in particular to a specific example of embodiment, it should not be considered limited to this example of embodiment, and all variants, modifications or simplifications covered by the appended claims, such as a different geometry of the combustion head 10, of the injection element 21, of the chambers 22 and 33, of the combustion block 38 and in particular of the suction element 19, a different suction method of the gases G in proximity of the inner surface 57 of the side wall 56, a different arrangement of the burners 1 inside the apparatus 55 (both in relation to position and alignment), a different transport system 4, etc., fall within its scope.

The apparatus and the burner described above offer numerous advantages.

Firstly, the production and assembly of the burner 1 are simplified relative to prior art solutions comprising more components. Furthermore, the burner 1, given the geometry and the penetration into the firing chamber 3, can easily be installed in substitution (as improvement) of a standard architecture.

Moreover, the presence of the discharge element 18 inside the chamber 3 and of the suction element 19 in proximity of the inner surface 57 of the wall 56 and not inside the wall 56, make it possible to avoid, together with fuel staging, problems linked to overheating of this wall 56, usually made of brick, which would cause overheating, with possible breakages, of the combustion block 38 and/or overheating of the mixing body 5 (usually made of metal), which in turn would generate a risk of burns for the operators and a considerable energy loss.

Further advantages of the present invention lie in the decrease in losses, in the increase of combustion (the recirculation obtained, of at least 50% of the combustion products of the burner, allows the use of adjustments with reduction of oxidizer, exploiting the residual oxygen present in the recirculated gases G) and of the uniformity of the temperature inside the firing chamber 3, determine, by the apparatus 55 and the burner 1 in accordance with the present invention, the need for a smaller quantity of gas (particularly useful in the case of fuels that are problematic to manage such as hydrogen) to be introduced into the burner 1 to maintain a certain temperature, relative to the prior art solutions.

Moreover, the use of a multistage combustion head 10, in combination with the injection element 21 allows a reduction in the temperature peaks of the flame, which are the main reason for the creation of nitrogen oxides. Therefore, the present invention determines a reduction in nitrogen oxides (NOx), in particular below the 50 ppm utilising natural gas.

In addition, the synergic effect between the multistage combustion head 10, the injection element 21 and the combustion block 38 allows the use of much smaller outlets, making it possible to reach a flame speed of around 200 m/s.

The present invention is configured to be supplied by different types of gas (for example methane or LPG) and is designed to operate with environmentally sustainable fuels, such as hydrogen enriched methane, pure hydrogen, etc. In particular, the structure of the feeding channels of the oxidizer varies depending on the fuel used.

Compared to a conventional burner, the flame of the burner in accordance with the present invention is more homogeneous and less swirled. This feature allows the flame to remain stretched and to propagate to a greater extent without spreading out too far in the surrounding environment (i.e., in the firing chamber 3). This effect ensures that the ceramic articles that pass through during firing are not greatly affected by the direct interaction of the flame, thereby avoiding any technological defects (colour shading, different calibres, etc.) due to the temperature peaks often determined by direct interaction with the flame.

Moreover, the strong recirculation created by the very high flame speed of the burner 1, comprising a combustion block as described above, dilutes the flame temperature (i.e., decreases the peaks increasing the median) and increases the convective exchange coefficient with the ceramic articles T. For this reason, compared to a conventional architecture and with the same power, the present invention allows the material to heated to a greater extent without "attacking" it with temperature peaks in the area of the flames and oxidizing in a more homogeneous manner the organic substances contained in the ceramic articles T and hence preventing the occurrence of darker colour in the inner portion of a sectioned article. In this way, the risk of the ceramic articles T exploding in a preheating zone of the kiln 2, for example when articles with an excessive moisture content are fired, is also partially inhibited.

Finally, thanks to the special structure of the injection element, a large part of the flame is generated downstream of the combustion head, decreasing problems linked to flashback of the hydrogen and advancing the flame front.

The invention claimed is:

1. A burner for the firing of ceramic articles (T), which can be installed in an industrial kiln comprising a firing chamber;

the burner comprising:

a mixing body comprising, in turn, at least one duct to feed a fuel (FL) provided with a percentage of hydrogen and at least one duct to feed an oxidizer (OX);

a spark device to start a combustion; a flame detection device;

a first tubular discharge element, which is configured to be flown through by a fluid (F) flowing out of the mixing body and is provided with a first end, into which at least part of the mixing body is inserted, and a second end, which is opposite the first end;

wherein:

the mixing body comprises both: (i) a fuel partitioning system (FPS) for the fuel (FL), which is configured to divide the fuel (FL) into a plurality of first portions (FL', FL", FL'"), and (ii) an oxidizer partitioning system (OPS) for the oxidizer (OX), which is configured to divide the oxidizer (OX) into a plurality of second portions (OX', OX", OX'"), which are conveyed so as be mixed in at least two different stages with the first portions.

2. The burner according to claim 1, wherein:

the oxidizer partitioning system (OPS) for the oxidizer (OX) comprises a combustion head, which is at least partially arranged inside the first tubular discharge element and comprises one or more combustion chambers, which are each configured to contain a different stages (M', M") of the combustion of a flame; and the fuel partitioning system (FPS) for the fuel (FL) comprises an injection element, which is configured to inject at least the greatest part (FL'") of the fuel (FL) downstream of the combustion head towards the second end; in particular, the first tubular discharge element being configured to contain a primary stage (F') of the combustion of the flame.

3. The burner according to claim 2, wherein:

the injection element comprises a tubular duct, in particular an axial one, which goes through said one or more combustion chambers from side to side; and in particular, the fuel feeding duct comprises at least one narrow portion with a cross section that is smaller than the one of the tubular duct.

4. The burner according to claim 3, wherein the tubular duct has a substantially constant cross section, in particular a circular one.

5. The burner according to claim 4, wherein the tubular duct has a first cross section having a diameter ranging from 2 mm to 12 mm, in particular from 4 mm to 10 mm.

6. The burner according to claim 3, wherein the tubular duct has one or more fuel distribution openings in the area of each combustion chamber so as to inject at least one of the second portions (FL', FL") into each one of them.

7. The burner according to claim 6, wherein said one or more openings are through holes, which connect an inner area of the tubular duct to a combustion chamber.

8. The burner according to claim 7, wherein the through holes are radial holes, in particular arranged in a ring shape.

9. The burner according to claim 3, wherein:

the tubular duct comprises a first end, which is connected to the fuel feeding duct for the fuel (FL), and a second end (26'), which projects into the first tubular discharge element towards the second end; and in particular, the tubular duct extends along a longitudinal symmetry axis (AA) of the burner.

10. The burner according to claim 1, wherein the fuel feeding duct comprises at least one narrow portion with a cross section having a diameter smaller than 10 mm, in particular ranging from 4 mm to 8 mm.

11. The burner according to claim 10, wherein:

the narrow portion is obtained as one single piece on a breech of the mixing body; and in particular, the breech of the mixing body lacking any opening configured to pre-mix oxidizer (OX) and fuel (FL) upstream of the oxidizer partitioning system (OPS).

12. The burner according to claim 1, wherein:

the combustion head comprises at least a first combustion chamber, which is configured to generate a first flame combustion phase (M'), and a second combustion chamber, which communicates with the first combustion chamber and is configured to generate a second flame combustion phase (M") just out of the second combustion chamber;

the first and the second combustion chamber being configured to convey part of the flame into the first tubular discharge element towards the second end;

in particular, the burner comprising further fuel distribution openings connecting the fuel feeding duct for the fuel (FL) to the first combustion chamber; and in particular, said further fuel distribution openings comprising axial holes, preferably arranged like a crown around a longitudinal symmetry axis of the burner.

13. The burner according to claim 1, wherein the flame detection device comprises a UV probe, in particular arranged along a longitudinal axis (AA) of the burner on board a breech of the mixing body.

14. The burner according to claim 1, and further comprising:

at least one second tubular discharge element, which extends from the second end towards the opposite side relative to the first end; and a suction element, which is configured to lead at least part of the gases (G) present on the outside of the burner into the second tubular discharge element and is provided with one or more openings arranged between the first and the second tubular discharge element.

15. An industrial apparatus for the firing of ceramic articles (T) comprising:

a tunnel kiln provided with at least one side wall, which at least partially delimits a firing chamber and has an inner surface on the inside of the firing chamber and an outer surface on the outside of the firing chamber;

a transport system, which is configured to convey a plurality of ceramic articles (T) along a conveying path (P) inside the firing chamber;

wherein the apparatus comprises at least one burner according to claim 1;

the industrial apparatus comprising at least one hydrogen feeding system, which is configured to inject hydrogen or a mixture comprising hydrogen into the fuel feeding duct.

16. The apparatus according to claim 15, wherein:

the suction element is arranged between the first tubular discharge element and a second tubular discharge element and, at least partially, inside the firing chamber;

the suction element being configured to lead at least part of the gases (G) present in the firing chamber into the second discharge element;

in particular, the suction element is arranged in the area of the inner surface of the side wall;

the suction element is configured to create a depression between the first discharge element and the second discharge element so as to lead at least part of the gases (G, G') present in the firing chamber into the second discharge element; in particular, the apparatus comprises a plurality of burners arranged in series along a direction (DD), which is parallel to the conveying path (P); and in particular, said burner has a longitudinal axis (AA), which is transverse (in particular, perpendicular) to the conveying path (P), for example perpendicular to said wall of the industrial kiln.

17. The apparatus according to claim 15, further comprising:

at least one electronic control unit, which is configured to control the burner so as to cyclically shift from a firing configuration with flame to a flameless firing configuration;

in particular, the electronic control unit being configured to cyclically put out the flame by decreasing the feeding of fuel and, if necessary, of oxidizer, restore the feeding of fuel and, if necessary, of oxidizer, thus allowing the burner to fire in flameless mode, and re-spark the flame in order to go back to the firing configuration with flame.

18. A method for the firing of ceramic articles (T) conveyed inside a tunnel kiln and comprising the steps of:

feeding a burner, in particular according to claim 1, with a fuel comprising at least a percentage of hydrogen exceeding 20%, in particular exceeding 50%, more in particular exceeding 70%;

simultaneously feeding said burner with an oxidizer and sparking a flame at least partially inside the burner and a firing chamber of the tunnel kiln;

controlling said flame with a feedback control;

wherein the method cyclically comprises, once the firing chamber of the kiln has reached a given temperature, the further steps of:

putting out the flame by decreasing the feeding of fuel and, in particular, of oxidizer; and restoring the feeding of fuel and, in particular, of oxidizer, thus generating, inside the tunnel kiln, a flameless combustion, which fires the ceramic articles.

* * * * *